United States Patent
Kuwayama et al.

(10) Patent No.: US 9,469,378 B2
(45) Date of Patent: Oct. 18, 2016

(54) BICYCLE DERAILLEUR

(71) Applicant: Shimano Inc., Sakai, Osaka (JP)

(72) Inventors: Kazuya Kuwayama, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 181 days.

(21) Appl. No.: 14/488,781

(22) Filed: Sep. 17, 2014

(65) Prior Publication Data

US 2016/0075401 A1    Mar. 17, 2016

(51) Int. Cl.
B62M 9/1342    (2010.01)
(52) U.S. Cl.
CPC .................. B62M 9/1342 (2013.01)
(58) Field of Classification Search
CPC  B62M 9/131; B62M 9/1342; B62M 9/1344; B62M 9/1348
See application file for complete search history.

(56) References Cited

U.S. PATENT DOCUMENTS

| | | | | |
|---|---|---|---|---|
| 2006/0058133 A1* | 3/2006 | Tetsuka | ............... | B62M 9/1342 474/80 |
| 2008/0190234 A1* | 8/2008 | Kawakami | ........... | B62M 9/1344 74/489 |
| 2009/0111625 A1* | 4/2009 | Valle | .................... | B62M 9/1342 474/80 |
| 2010/0075788 A1* | 3/2010 | Wickliffe | ............. | B62M 9/1342 474/80 |
| 2015/0094177 A1* | 4/2015 | Emura | ................. | B62M 9/1242 474/80 |
| 2015/0094178 A1* | 4/2015 | Emura | ................. | B62M 9/1242 474/80 |

* cited by examiner

*Primary Examiner* — William E Dondero
*Assistant Examiner* — Robert T Reese
(74) *Attorney, Agent, or Firm* — Global IP Counselors

(57) ABSTRACT

A bicycle derailer includes abuse member, a movable member and a linkage assembly. The base member is mounted to a bicycle frame. The movable member moves between a retracted position and an extended position at which the movable member is farther from the base member than the retracted position. The linkage assembly operatively couples the base member and the movable member. The linkage assembly includes a first link, a second link, an extension link and a sliding link. The first and second links are pivotally coupled between the base member and the movable member. The extension link extends from one of the first and second links toward the other of the first and second links. The sliding link includes a sliding portion slidably coupled to the extension link to slide along the extension link and a pivoting portion pivotally coupled to the other of the first and second links.

17 Claims, 10 Drawing Sheets

BICYCLE DERAILLEUR

BACKGROUND

1. Field of the Invention

This invention generally relates to a bicycle derailleur. More specifically, the present invention relates to a bicycle derailleur having a linkage assembly operatively disposed between a base member and a movable member that reduces an operating force during a movement range of the movable member with respect to the base member.

2. Background Information

Many bicycles are provided with a drivetrain that allows the rider to changing a gear ratio for transferring power from the pedals to the rear wheel. Often, in a drivetrain that has a chain extending from a front crankset to a rear cassette, the drivetrain sometimes uses one or more derailleurs to change the gear ratio. A front derailleur is mounted to the bicycle frame adjacent to front chain rings to shift a chain laterally between the front chain rings. A rear derailleur is mounted adjacent to a hub of the rear wheel to shift the chain laterally between rear sprockets. In either case, the derailleur typically includes a fixed or base member that is non-movably secured to the bicycle frame and a movable member. The movable member typically includes a chain guide that is movably supported relative to the base member to move between at least two lateral shift positions. Typically, a linkage assembly is coupled between the base member and the movable member in order to movably support the movable member with the chain guide. The derailleur is typically operated by an operation cable that is coupled between a shifter and the derailleur.

SUMMARY

Generally, the present disclosure is directed to various features of a bicycle derailleur. One object of the present invention is to provide a bicycle derailleur that is reduces an operating force during a movement range of the movable member with respect to the base member.

In view of the state of the known technology and in accordance with a first aspect of the present disclosure, a bicycle front derailleur is basically provided that comprises a base member, a movable member, and a linkage assembly. The base member is configured to be mounted to a bicycle frame. The movable member is configured to be movable with respect to the base member between a retracted position and an extended position at which the movable member is farther from the base member than the retracted position. The linkage assembly is operatively coupled between the base member and the movable member. The linkage assembly comprises a first link, a second link, an extension link and a sliding link. The first link is pivotally coupled to the movable member about a first pivot axis. The second link is pivotally coupled to the movable member about a second pivot axis spaced apart from the first pivot axis. The extension link extends from one of the first and second links toward the other of the first and second links. The sliding link includes a sliding portion slidably coupled to the extension link to slide along the extension link and a pivoting portion pivotally coupled to the other of the first and second links.

In accordance with a second aspect of the present invention, the bicycle derailleur according to the first aspect is configured so that the sliding link is configured to slide along the extension link toward one of the first and second links in response to pivotal movement of the first and second links about the first and second pivot axes, respectively.

In accordance with a third aspect of the present invention, the bicycle derailleur according to the first aspect further comprises a biasing member operatively biasing the sliding link to slide toward the other of the first and second links by a biasing force of the biasing member.

In accordance with a fourth aspect of the present invention, the bicycle derailleur according to the first aspect is configured so that the first link, the second link, the extension link and the sliding link are configured such that a rotational degree of the first link is greater than a rotational degree of the sliding link as the movable member moves between the retracted position and the extended position.

In accordance with a fifth aspect of the present invention, the bicycle derailleur according to the first aspect is configured so that the extension link is non-movably supported to the one of the first and second links.

In accordance with a sixth aspect of the present invention, the bicycle derailleur according to the first aspect further comprises an input arm configured to receive an input force to move the first and second links.

In accordance with a seventh aspect of the present invention, the bicycle derailleur according to the sixth aspect is configured so that the input arm extends from the one of the first and second links.

In accordance with an eighth aspect of the present invention, the bicycle derailleur according to the first aspect is configured so that the sliding link is shorter than the first link.

In accordance with a ninth aspect of the present invention, the bicycle derailleur according to the eighth aspect is configured so that the sliding link is shorter than the second link.

In accordance with a tenth aspect of the present invention, the bicycle derailleur according to the first aspect is configured so that the first link is pivotally coupled to the base member about a third pivot axis, and the second link is pivotally coupled to the base member about a fourth pivot axis that is spaced apart from the third pivot axis.

In accordance with an eleventh aspect of the present invention, the bicycle derailleur according to the first aspect is configured so that the extension link has a curved guide coupled with the sliding portion of the sliding link such that the sliding portion slides along a curved sliding path as the movable member moves between the retracted position and the extended position.

In accordance with a twelfth aspect of the present invention, the bicycle derailleur according to the first aspect is configured so that the sliding link is pivotally connected to the first link about the first pivot axis, the first link being disposed closer to the bicycle frame than the second link, in a state where the base member is mounted to the bicycle frame, and the extension link extends from the second link towards the first link.

In accordance with a thirteenth aspect of the present invention, the bicycle derailleur according to the twelfth aspect is configured so that the biasing member is a torsion spring having a coiled portion disposed around the first pivot axis.

In accordance with a fourteenth aspect of the present invention, the bicycle derailleur according to the thirteenth aspect further comprises an input arm having a cable attachment structure, and the input arm extending from the second link.

In accordance with a fifteenth aspect of the present invention, the bicycle derailleur according to the first aspect is configured so that the sliding link is pivotally connected to the second link about the second pivot axis, the first link being disposed closer to the bicycle frame than the second link in a state where the base member is mounted to the bicycle frame, and the extension link extends from the first link towards the second link.

In accordance with a sixteenth aspect of the present invention, the bicycle derailleur according to the fifteenth aspect is configured so that the biasing member is a torsion spring having a coiled portion disposed around the second pivot axis.

In accordance with a seventeenth aspect of the present invention, the bicycle derailleur according to the sixteenth aspect further comprises an input arm having a cable attachment structure, and the input arm extending from the first link.

Also other objects, features, aspects and advantages of the disclosed bicycle derailleur will become apparent to those skilled in the art from the following detailed description, which, taken in conjunction with the annexed drawings, discloses one embodiment of the bicycle derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
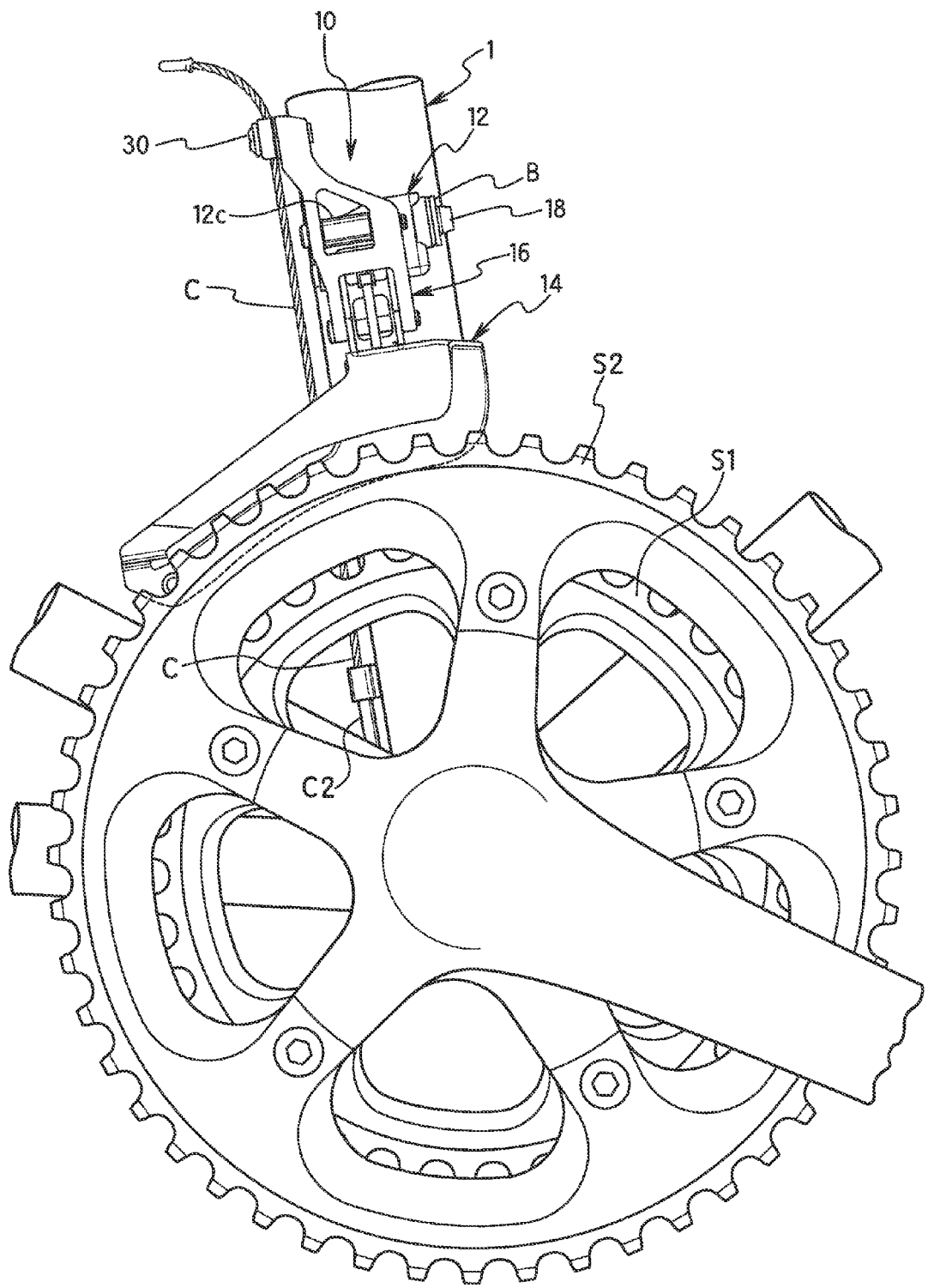
FIG. 1 is a partial side elevational view of a bicycle frame with a front derailleur mounted thereto in accordance with a first illustrated embodiment.
Figure 2:
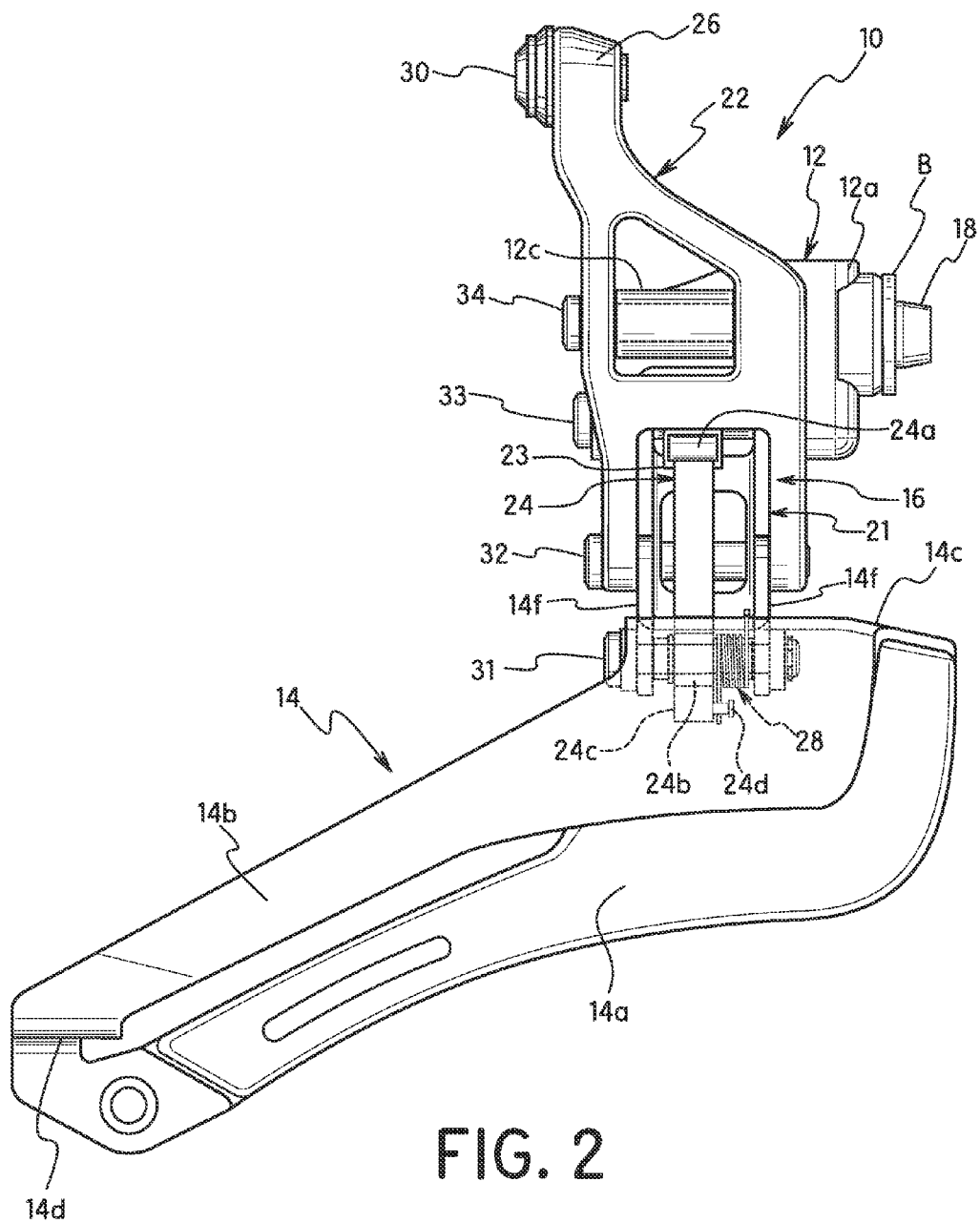
FIG. 2 is an enlarged outside elevational view of the front derailleur illustrated in FIG. 1.
Figure 3:
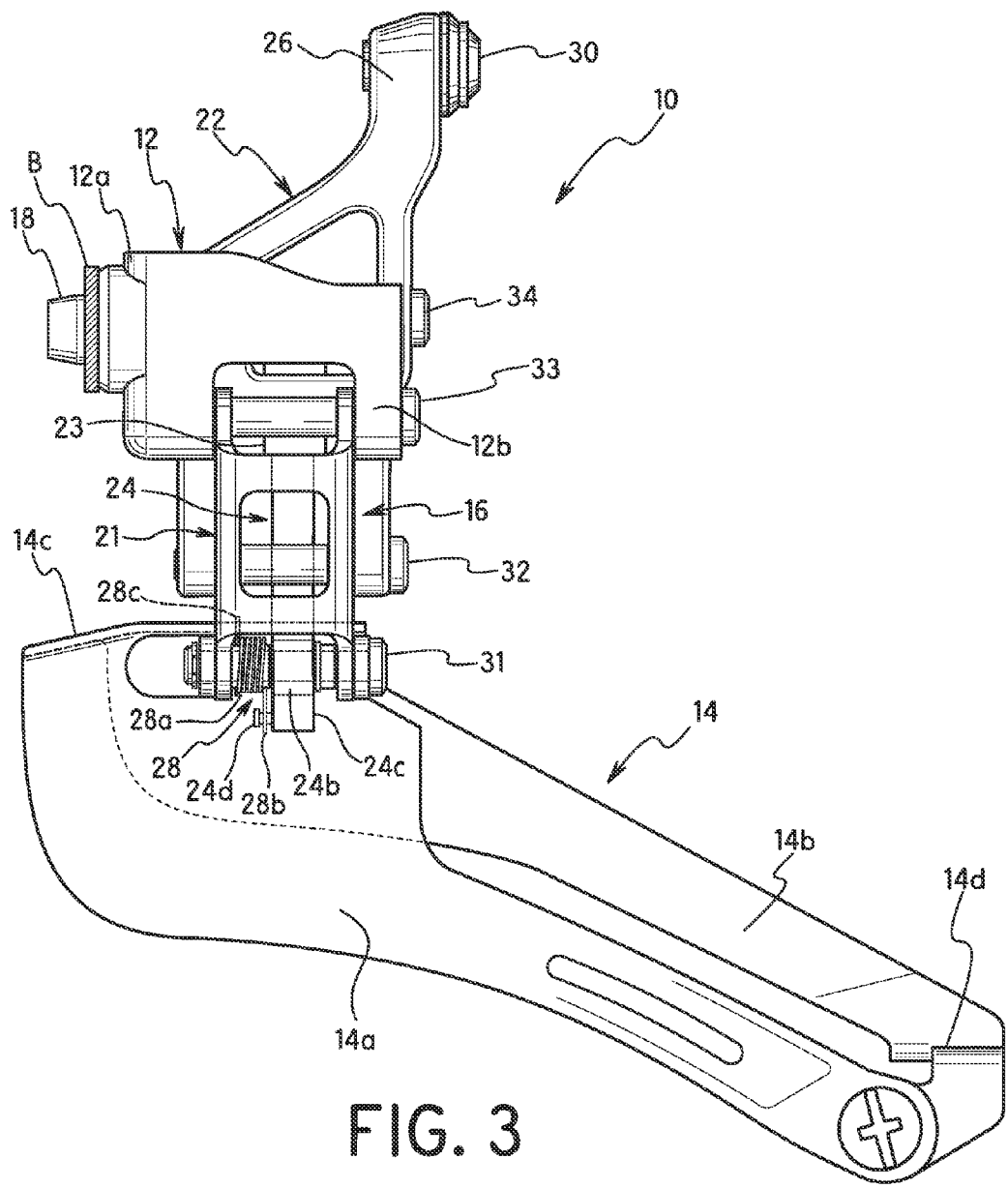
FIG. 3 is an enlarged inside elevational view of the front derailleur illustrated in FIGS. 1 and 2.

Referring initially to FIG. 1, a bicycle frame 1 is illustrated that is equipped with a bicycle front derailleur 10 in accordance with a first embodiment. The bicycle frame 1 has a conventional braze-on mounting bracket B for supporting the front derailleur 10 on the frame 1. The front derailleur 10 is an operating cable operated derailleur that is operated in response to operation of a shifter (not shown) in a conventional manner. In particular, the bicycle front derailleur 10 is operated by an operation of a control cable C that is connected at a first end to the bicycle front derailleur 10 and that is connected at a second end to the shifter (not shown). The control cable C is a conventional bicycle control cable that has an inner wire C1 covered by an outer casing C2. In other words, the control cable C is a Bowden type cable in which the inner wire C1 is slidably received within the outer casing C2. The shifter (not shown) operates the front derailleur 10 by selectively pulling and releasing the inner wire C1 in response to operation of a shifter (not shown).

The front derailleur 10 moves a bicycle chain (not shown) in a transverse direction with respect to the bicycle frame 1. In the illustrated embodiment, the front derailleur 10 is designed to shift a bicycle chain (not shown) between a small chain ring S1 and a large chain ring S2 depending on whether the control cable C is pulled or released. In the first embodiment, with the bicycle chain being maintained on the small chain ring S1, the front derailleur 10 shifts the bicycle chain from the small chain ring S1 to the large chain ring S2 in response to the control cable C being pulled. On the other hand, in the first embodiment, with the bicycle chain being maintained on the large chain ring S2, the front derailleur 10 shifts the bicycle chain from the large chain ring S2 to the small chain ring S1 in response to the control cable C being released.

Figure 6:
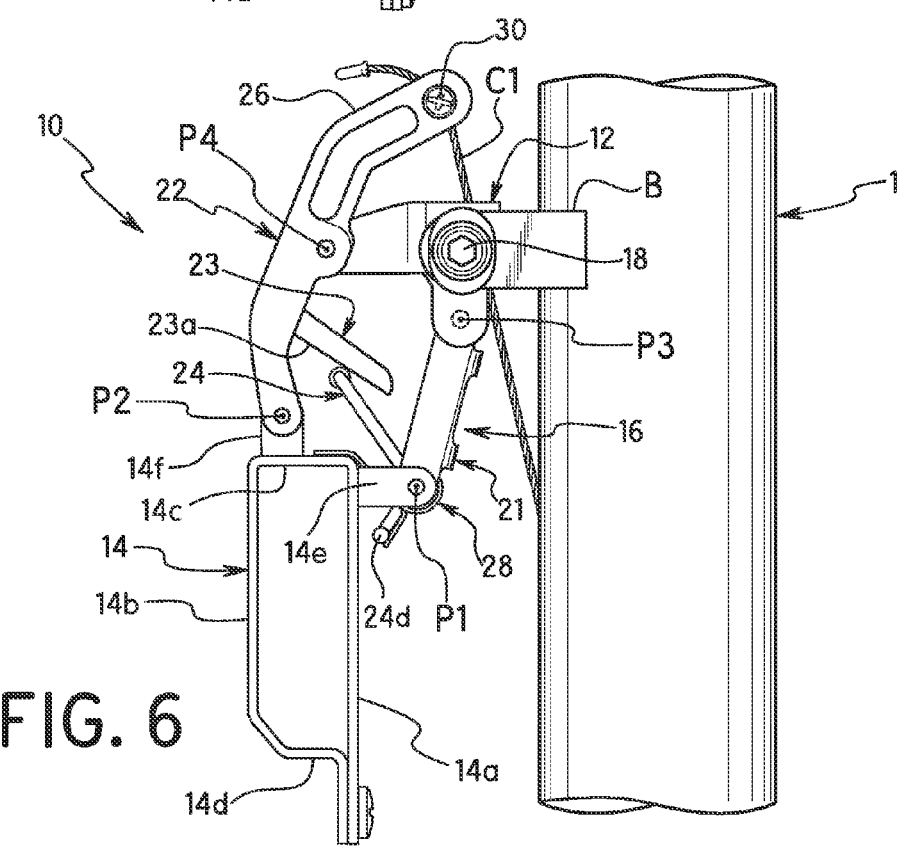
FIG. 6 is a front elevational view of the front derailleur illustrated in FIGS. 1 to 5, with the movable in an extended position with respect to the base member and the bicycle frame.

As shown in FIGS. 2 to 6, the bicycle front derail 10 basically comprises a base member 12, a movable member 14 and a linkage assembly 16. The base member 12 is configured to be mounted to the bicycle frame 1 by a fixing bolt 18. The movable member 14 is configured to be movable with respect to the base member 12 between a retracted position (FIGS. 5 and 7) and an extended position (FIGS. 6 and 8). At the extended position, the movable member 14 is farther from the base member 12 than when in the retracted position. The linkage assembly 16 is operatively coupled between the base member 12 and the movable member 14 so that the movable member 14 can move between the retracted position and the extended position.

In the first illustrated embodiment, the bicycle front derailleur 10 further comprises an input arm 26 that is configured to receive an input force of the inner wire C1 to move the linkage assembly 16, which in turn moves the movable member 14 relative to the base member 12. Also in the first illustrated embodiment, the bicycle derailleur 10 further comprises a biasing member 28 that is arranged to bias the movable member 14 towards the retracted position.

The input arm 26 has a threaded hole 26*a* that threadedly receives a cable attachment bolt 30 for connecting the inner wire C1 to the linkage assembly 16. Thus, the input arm 26 has a cable attachment structure (i.e., the threaded hole 26*a* and the cable attachment bolt 30 in the first embodiment). While the control cable attachment structure is illustrated as the cable attachment bolt 30, it will be apparent to those skilled in the bicycle field from this disclosure that other suitable control cable attachment structure can be used. For example, the control cable attachment structure can be a wire clamp, or merely a hole that is sized for receiving the inner wire C1 such that a cable nipple abuts against the input arm 26.

Basically, in the first embodiment, the inner wire C1 is connected to the input arm 26 for applying an operating force or torque thereto in order to move the movable member 14 between the retracted position and the extended position relative to the base member 12. In other words, the movable member 14 is moved relative to the base member 12 by pulling and/or releasing the input arm 26 that is operatively coupled between a shifter (not shown) and the input arm 26 of the front derailleur 10 for selectively positioning the bicycle chain over one of the chain rings S1 and S2. More specifically, by pulling the inner wire C1 while the movable member 14 is in the retracted position, the linkage assembly 16 moves the movable member 14 from the retracted position (FIGS. 5 and 7) to the extended position (FIGS. 6 and 8) against the biasing force of the biasing member 28. On the other hand, when the movable member 14 is in the extended position, the linkage assembly 16 moves the movable member 14 from the extended position (FIGS. 6 and 8) to the retracted position (FIGS. 5 and 7) due to the biasing force of the biasing member 28 upon the inner wire C1 being released.

Figure 4:
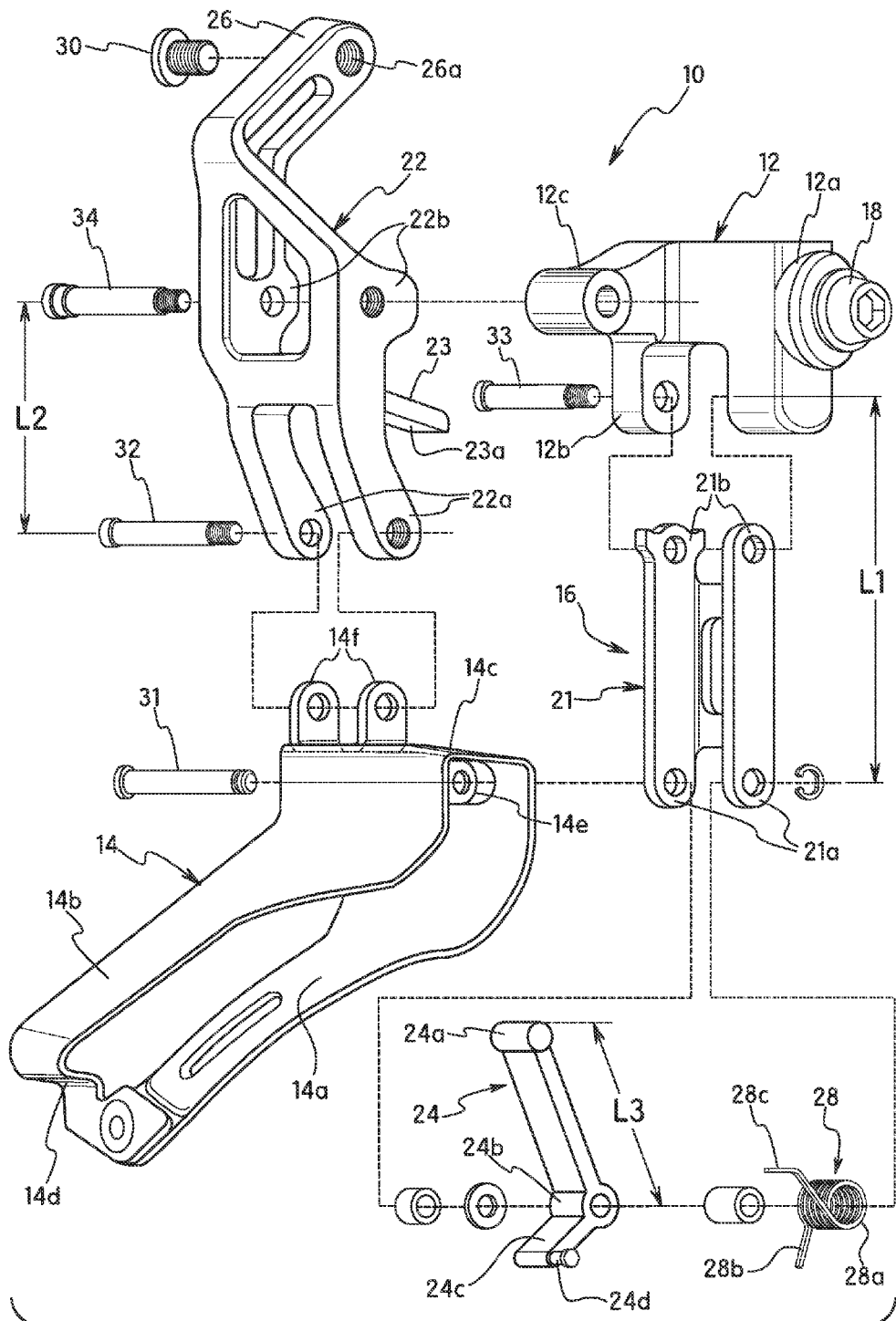
FIG. 4 is an exploded perspective view of the front derailleur illustrated in FIGS. 1 to 3.
Figure 5:
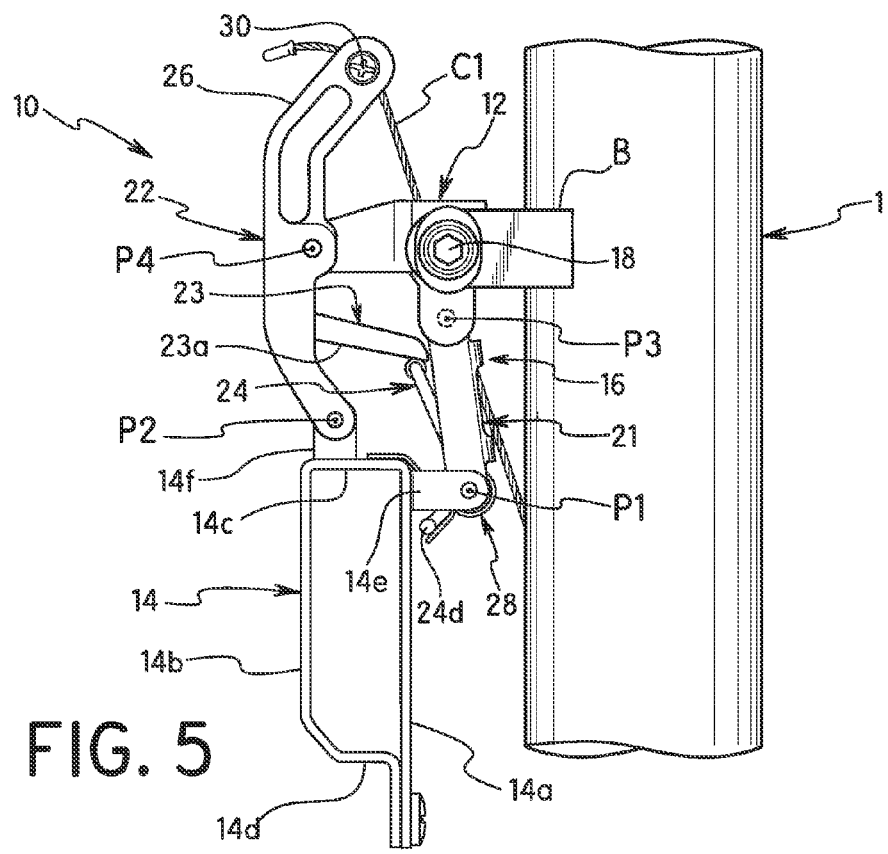
FIG. 5 is a front elevational view of the front derailleur illustrated in FIGS. 1 to 4, with the movable in a retracted position with respect to the base member and the bicycle frame.
Figure 7:
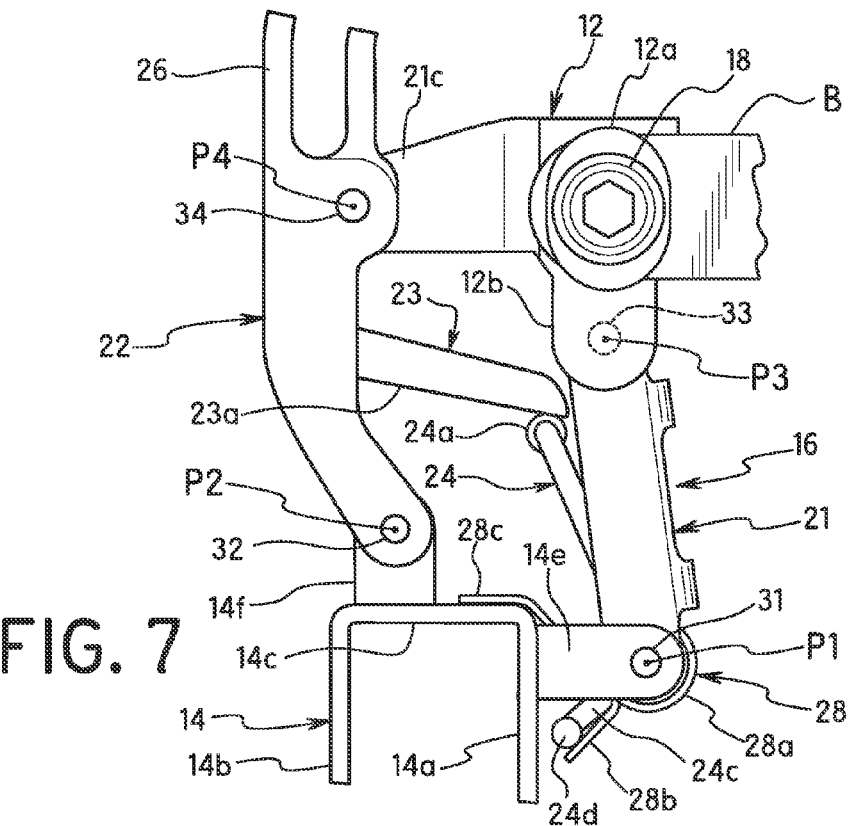
FIG. 7 is an enlarged front elevational view of a portion of the front derailleur illustrated in FIG. 5, with the movable in the retracted position.
Figure 8:
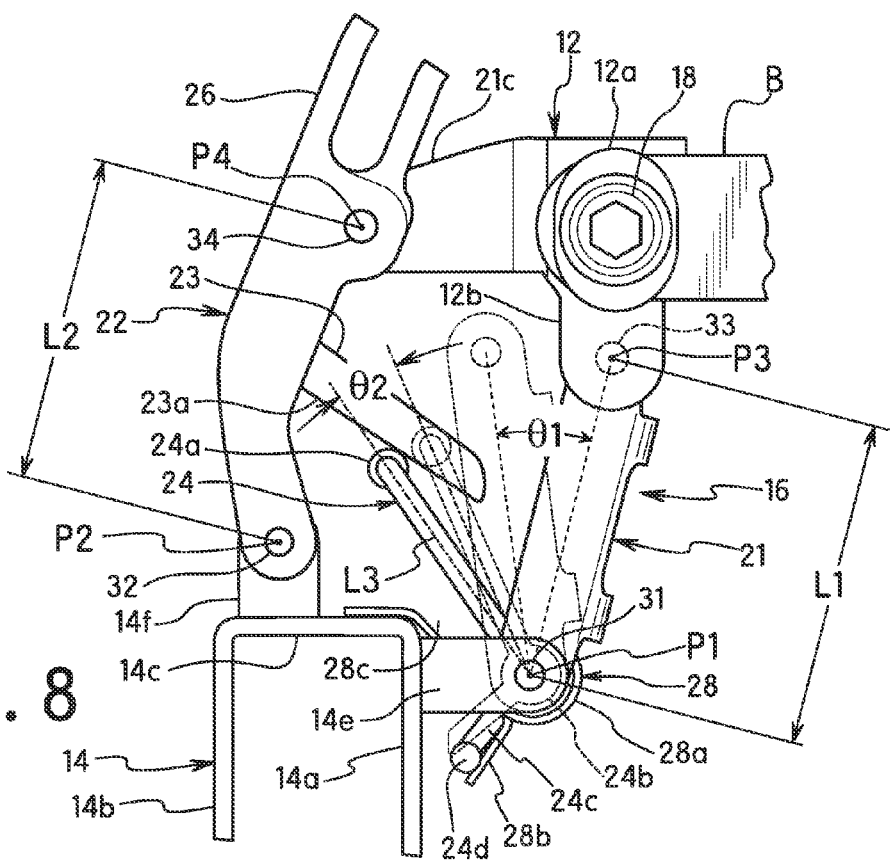
FIG. 8 is an enlarged front elevational view of the front derailleur illustrated in FIG. 6, with the movable in the extended position.
Figure 9:
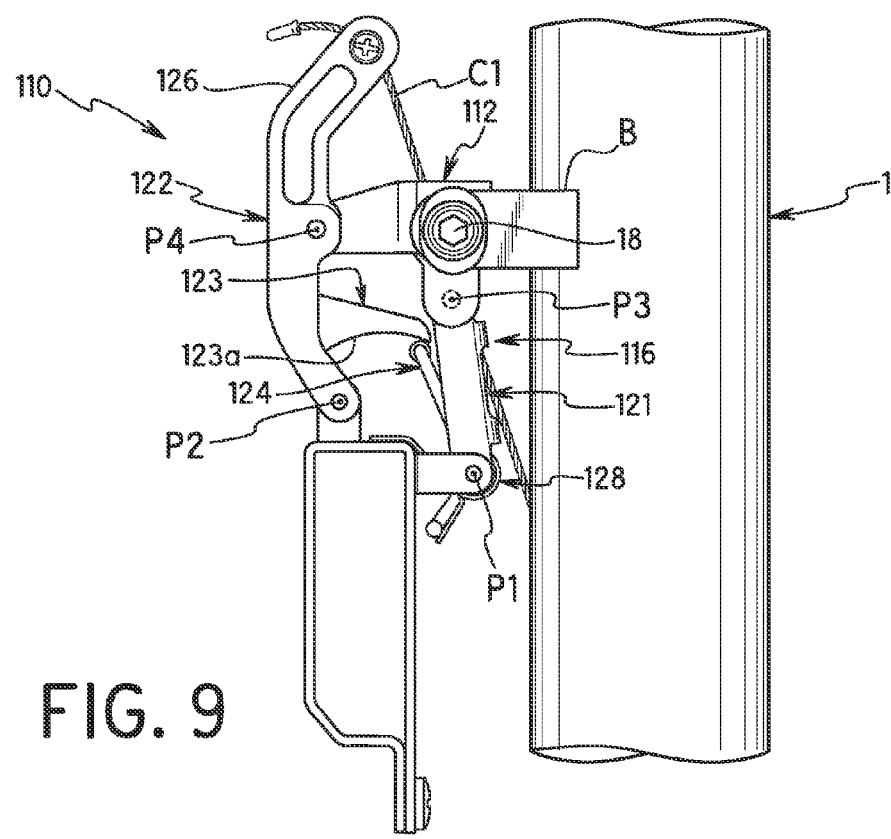
FIG. 9 is a front elevational view of a front derailleur in accordance with a second embodiment with the movable member in a retracted position with respect to the base member.

As best seen in FIGS. 4, 7 and 8, the base member 12 includes a bicycle mounting portion 12*a*, first mounting portion 12*b* and a second link mounting portion 12*c*. In the first illustrated embodiment, the bicycle mounting portion 12*a* of the base member 12 is secured to a seat tube of the bicycle frame 1 as seen in FIG. 1. Of course, it will be apparent to those skilled in the bicycle field from this disclosure that the base member 12 can have other configurations as needed and/or desired. For example, the base member 12 could be attached to the hanger tube by the bottom bracket or a chain stay if needed and/or desired. Typically, the base member 12 is a rigid member that is made of a metal material or a fiber reinforced material. The base member 12 supports the movable member 14 via the linkage assembly 16, which is pivotally coupled to the base member 12 as discussed below. Preferably, the base member 12 includes first and second (e.g., low and top) limit screws (not shown) that finely adjust the top and low positions of the movable member 14. In other words, first and second limit screws are configured and arranged to adjust the retracted (low) position of the movable member 14 relative to the base member 12 and the extended (top) position of the movable member 14 relative to the base member 12. Limit screws in derailleurs are conventional, and thus, they have not been illustrated in the Figures for the sake of simplicity of illustration.

Now, the movable member 14 will be discussed in more detail, in the first illustrated embodiment, the movable member 14 includes a first guide plate 14*a* and a second guide plate 14*b*. The first guide plate 14*a* is connected to the second guide plate 14*b* by a first connecting portion 14*c* and a second connecting portion 14*d*. The first guide plate 14*a*, the second guide plate 14*b*, the first connecting portion 14*c* and the second connecting portion 14*d* are formed as a one-piece, unitary member from a suitable metal sheet material. The second connecting portion 14*d* is attached to the first guide plate 14*a* by a fastener (e.g., a bolt or a rivet). The first guide plate 14*a* has a first inner surface for contacting and laterally shifting the bicycle chain such that the bicycle chain moves in an outward direction with respect to the bicycle frame 1 from the small chain ring S1 to the large chain ring S2. Similarly, the second guide plate 14*b* has a second inner surface for contacting and laterally shifting the bicycle chain such that the bicycle chain moves in an inward direction with respect to the bicycle frame 1 from the large chain ring S2 to the small chain ring S1. Accordingly, the first and second guide plates 14*a* and 14*b* form a chain receiving slot therebetween. As a result, the first guide plate 14*a*, the second guide plate 14*b*, the first connecting portion 14*c* and the second connecting portion 14*d* constitutes a chain guide of the movable member 14. The movable member 14 further includes a first link connecting portion 14*e* and a second link connecting portion 14*f*. Here, the first link connecting portion 14*e* is formed by two flanges that are pivotally coupled to the linkage assembly 16. The first link connecting portion 14*e* extends from an outer surface of the first guide plate 114*a*. Similarly, the second link connecting portion 114*f* is formed by a two flanges that are pivotally coupled to the linkage assembly 16. The second link connecting portion 14*f* extends from an outer surface of the first connecting portion 14*c*.

As seen in FIGS. 4 to 8, the linkage assembly 16 basically comprises a first link 21, a second link 22, an extension link 23 and a sliding link 24. The first and second links 21 and 22 are pivotally coupled to the base member 12 and the movable member 14 so that the movable member 14 can move between the retracted position (FIGS. 5 and 7) and the extended position (FIGS. 6 and 8). The extension link 23 extends from one of the first and second links 21 and 22 toward the other of the first and second links 21 and 22. In particular, the extension link 23 is non-movably supported to the one of the first and second links 21 and 22. In the first illustrated embodiment, the extension link 23 is non-movably supported to the second link 22, and extends from the second link. 22 towards the first link 21. Thus the extension link 23 moves together with the second link 22. The sliding link 24 is slidably engages the extension link 23. Preferably, the sliding link 24 includes a sliding portion 24*a* and a pivoting portion 24*b*. The sliding portion 24*a* is slidably coupled to the extension link 23 to slide along the extension link 23. The sliding portion 24*a* is configured such that the sliding portion 24*a* does not become uncoupled from the extension link 23 as the sliding portion 24*a* slides along the extension link 23. The pivoting portion 24*b* is pivotally coupled to the other of the first and second links 21 and 22, which does not have the extension link 23. In the first illustrated embodiment, since the extension link 23 is non-movably supported to the second link 22, the sliding link 24 is pivotally coupled to the first link 21.

As seen in FIGS. 4 to 8, the first and second links 21 and 22 are pivotally attached between the base member 12 and the movable member 14 to form a four-bar linkage. In particular, the first link 21 is pivotally coupled to the movable member 14 about a first pivot axis P1. The first pivot axis P1 is defined by a first pivot axle 31 which extends through the first link connecting portion 14e and the first link 21. The second link 22 is pivotally coupled to the movable member 14 about a second pivot axis P2 that is spaced apart from the first pivot axis P1. The second pivot axis P2 is defined by a second pivot axle 32 which extends through the second link connecting portion 14f and the second link 22. The first link 21 is pivotally coupled to the base member 12 about a third pivot axis P3. The third pivot axis P3 is defined by a third axle 33 which extends through the first link mounting portion 12b and the first link 21. The second link 22 is pivotally coupled to the base member 12 about a fourth pivot axis P4 that is spaced apart from the third pivot axis P3. The fourth pivot axis P4 is defined by a fourth axle 34 which extends through the second link mounting portion 12c and the second link 22. The first, second, third and fourth pivot axes P1 to P4 are parallel to each other. Preferably, the first pivot axis P1 is below the second pivot axis P2, which is below the third pivot axis P3, which is below the fourth pivot axis P4 as viewed in a direction parallel to the pivot axes PT to P4 while the front derailleur 10 is in a state where the base member 12 is mounted to the bicycle frame 1 (i.e., in the installed position). Preferably, the first, second, third and fourth pivot axes P1 to P4 are arranged to define a parallelogram. Thus, the movable member 14 is movably supported to the base member 12 by the first and second links 21 and 22 between the retracted position (FIGS. 5 and 7) and the extended position (FIGS. 6 and 8) with respect to the base member 12. In the retracted position, the movable member 14 is positioned over the small chain ring S1. On the other hand, in the extended position, the movable member 14 is positioned over the large chain ring S2.

In the first illustrated embodiment, the first and second links 21 and 22, the extension link 23, the sliding link 24 and the biasing member 28 are arranged with respect to the base member 12 and the movable member 14 to form a bottom-pull arrangement and a down-swing arrangement. The bottom-pull arrangement refers to the inner wire C1 being pulled in a downward direction to move the movable member 14 against the biasing force of the biasing member 28 while the bicycle frame 1 is in a level, upright position. The inner wire C1 is often routed across the top or along a bottom of a bottom bracket shell of the bicycle frame 1 on a cable guide, which redirects the inner wire C1 upward along a lower edge of a down tube of the bicycle frame 1 to the shifter in a conventional manner. The down-swing arrangement refers to the movable member 14 being mounted to a bottom of a four-bar linkage formed by the pivotal connections of the first and second links 21 and 22 between the base member 12 and the movable member 14 that carries the movable member 14. Thus, in the first illustrated embodiment, the front derailleur 10 is a bottom-pull-down swing derailleur. However, the arrangement of the first and second links 21 and 22, the extension link 23, the sliding link 24 and the biasing member 28 can be used with a derailleur having a top pull arrangement and/or a top swing derailleur as needed and/or desired.

Now, the first link 21 will be discussed in more detail. The first link 21 is a rigid member that is made of a suitable material such as a metal material or a fiber reinforced material. Here in the illustrated embodiment, the first link 21 is an inner link. Thus, the first link 21 is disposed closer to the bicycle frame 1 than the second link 22 in a state where the base member 12 is mounted to the bicycle frame 1 (i.e., in the installed position). The first link 21 has an effective length L1. The effective length L1 of the first link 21 is measured between the first and third pivot axes P1 and P3. The first 21 includes a first connecting portion 21a that is pivotally coupled to the movable member 14 about the first pivot axis P1. Specifically, the first connecting portion 21a is attached to the first link connecting portion 14e of the movable member 14 by the first pivot axle 31. The first link 21 further includes a second connecting portion 21b that is pivotally coupled to the first link mounting portion 12b of the base member 12 about the third pivot axis P3. Specifically, the second connecting portion 21b is attached to the base member 12 by the third pivot axle 33.

Now, the second link 22 will be discussed in more detail. The second link 22 also includes the input arm 26 that is configured to receive an input force to move the first and second links 21 and 22 of the linkage assembly 16, which in turn moves the movable member 14 relative to the base member 12. In the first illustrated embodiment, the second link 22 and the input arm 26 are a one-piece member. The second link 22 is a rigid member that is made of a suitable material such as a metal material or a fiber reinforced material. While the input arm. 26 extends from the second link 22, it will be apparent to those skilled in the bicycle field from this disclosure that from either one of the first and second links 21 and 22 can have the input arm 26. Preferably, the input arm 26 extends from the one of the first and second links 21 and 22 that has the extension link 23.

Here in the illustrated embodiment, the second link 22 is an outer link which is disposed farther from to the bicycle frame 1 than the first link 21 while the front derailleur 10 is in a state where the base member 12 is mounted to the bicycle frame 1 (i.e., in the installed position). The second link 22 has an effective length L2. The effective length L2 of the second link 22 is measured between the second and fourth pivot axes P2 and P4. Preferably, the effective length L2 of the second link 22 is equal to the effective length L1 of the first link 21. The second link 22 includes a first connecting portion 22a that is pivotally coupled to the movable member 14 about the second pivot axis P2. Specifically, the first connecting portion 22a is attached to the second link connecting portion 14f of the movable member 14 by the second pivot axle 32 which extends through the second link connecting portion 14f and the second link 22. The second link 22 further includes a second connecting portion 22b that is pivotally coupled to the second link mounting portion 12c of the base member 12 about the fourth pivot axis P4. Specifically, the second connecting portion 21a is attached to the base member 12 by the fourth pivot axle 34 which extends through the second link mounting portion 12c and the second link 22.

Now, the extension link 23 will be discussed in more detail. As mentioned above, in the first illustrated embodiment, the extension link 23 is non-movably fixed to the second link 22. In the first illustrated embodiment, the second link 22 and the extension link 23 are a one-piece member. However, the extension link 23 can be a separate member from the second link 22. In any case, the extension link 23 is a rigid member that is made of a suitable material such as a metal material or a fiber reinforced material. The extension link 23 extends from the second link 22 towards the first link 21. In other words, the extension link. 23 extends laterally in an inward direction with respect to the second link 22 towards the bicycle frame 1. The extension link 23 is located about midway between the second and fourth axes P2 and P4 as viewed in a direction parallel to the second pivot axis P2. The extension link 23 extends slightly downwardly with respect to a vertical direction. However, a location of the extension link 23 is not limited between the second and fourth pivot axes P2 and P4 with respect to the vertical direction. For example, the extension link 23 can extend from the fourth pivot axis P4. The extension link 23 has a planar guide 23a that is slidably coupled with the sliding portion 24a of the sliding link 24. The sliding portion 24a slides along the planar guide 23a as the movable member 14 moves between the retracted position and the extended position. The sliding portion 24a of the sliding link 24 contacts the planar guide 23a at a position that is below the third and fourth axes P3 and P4 as viewed in a direction parallel to the pivot axes P1 to P4 while the front derailleur 10 is in a state where the base member 12 is mounted to the bicycle frame 1 (i.e., in the installed position).

Now, the sliding link 24 will be discussed in more detail. The sliding link 24 is pivotally connected to the first link 21 by the first pivot axle 31 to pivot about the first pivot axis P1. In addition to the sliding portion 24a and the pivoting portion 24b, the sliding link 24 further includes a leg 24c with a projection 24d to engage the biasing member 28 for receiving the biasing force of the biasing member 28. The projection 24d is a pin that is attached to the leg 24c. Here, the sliding portion 24a, the pivoting portion 24b and the leg 24c are illustrated as a one-piece member. However, it will be apparent to those skilled in the bicycle field from this disclosure that the sliding portion 24a can be a separate member that is attached to the pivoting portion 24b. For example, the sliding portion 24a can be a roller, a bearing or a pad made of a material having a low coefficient of friction relative to the pivoting portion 24b and/or the planar guide 23a.

In any case, the sliding portion 24a is slidably coupled to the extension link 23 to slide along the planar guide 23a of the extension link 23 as the pivoting portion 24b pivots on the first pivot axle 31. During movement of the movable member 14 from the retracted position to the extended position against the biasing force of the biasing member 28, the sliding link 24 slides along the planar guide 23a of the extension link 23 towards the second link 21 as the first and second links 21 and 22 pivot about the first and second pivot axes P1 and P2, respectively.

Preferably, the sliding link 24 is shorter than the first link 21. Likewise, the sliding link 24 is shorter than the second link 22. In particular, the sliding link 24 has an effective length L3 as measured from the first pivot axis PT to the sliding portion 24a as its free end. The effective length L3 is shorter than the effective lengths L1 and L2.

Now, the biasing member 28 will be discussed in more detail. In the illustrated embodiment, the biasing member 28 is a torsion spring. The biasing member 28 is a torsion spring having a coiled portion 28a that is disposed around the first pivot axis P1. Thus, the coiled portion 28a is mounted on the first pivot axle 31. A first end 28b of the biasing member 28 is engaged with the projection 24d of the sliding link 24. A second end 28c of the biasing member 28 is engaged with the movable member 114. However the second end 28c can engage the first link 21 to bias the sliding link 24 so that the sliding portion 24a is biased toward the first link 21. The biasing member 28 is preferably in a pre-load state with the movable member 14 located in the retracted position. As mentioned above, the biasing member 28 operatively is disposed between the base member 12 and the movable member 14 such that the biasing member 28 biases the movable member 14 towards the retracted position. More specifically, the biasing member 28 operatively biases the sliding link 24 to slide toward the other of the first and second links 21 and 22 by a biasing force of the biasing member 28.

As seen in FIG. 8, with the configuration of the first embodiment, the first link 21, the second link 22, the extension link 23 and the sliding link 24 are configured such that a rotational degree $\theta 1$ of the first link 21 is greater than a rotational degree $\theta 2$ of the sliding link 24 as the movable member 14 moves between the retracted position and the extended position. In some conventional front derailleurs, a torsion spring has its coiled portion mounted on a pivot axle that pivotally mounts the inner link to the movable member and its free ends applying a biasing force on the movable member and the inner link. A winding degree of the biasing member in the conventional front derailleurs as the movable member moves between the retracted position and the extended position is equal to the rotational degree of the inner link. Thus, in such conventional front derailleurs, the ends of torsion spring needs to be loaded (winding degree) to a greater amount than with the configuration of the first embodiment, because a winding degree of the biasing member 28 is equal to the rotational degree $\theta 2$. As a result, the overall actuation force needed to move the movable member 14 from the retracted position and the extended position against the biasing force of the biasing member 28 is less as compared to the above-mentioned conventional front derailleurs. In particular, with the configuration of the first embodiment, the actuation force of the biasing member 28 is slightly higher as compared to the above-mentioned conventional front derailleurs during the first half of the movement of the movable member 14 from the retracted position towards the extended position. However, with the configuration of the first embodiment, the actuation force of the biasing member 28 is considerably lower as compared to the above-mentioned conventional front derailleurs during the second half of the movement of the movable member 14 from the retracted position towards the extended position.

Referring now to FIGS. 9 to 12, a bicycle front derailleur 110 is illustrated in accordance with a second embodiment. The front derailleur 110 is attached the bicycle frame 1 and operated by movement of the inner wire C1 in the same manner as discussed above with respect to the front derailleur 10. The bicycle front derailleur 110 basically comprises a base member 112, a movable member 114 and a linkage assembly 116.

The front derailleur 110 is identically to the front derailleur 10, except that the linkage assembly 116 has been modified as explained below. Thus, the parts of the front derailleur 110 that are identical to the front derailleur 10 will not be discussed in detail herein. Rather, it will apparent that the descriptions of the parts of the front derailleur 110 that are identical to the front derailleur 10 also apply to the front derailleur 110. Thus, the following description focuses on the differences of the front derailleur 110 from the front derailleur 10.

Figure 10:
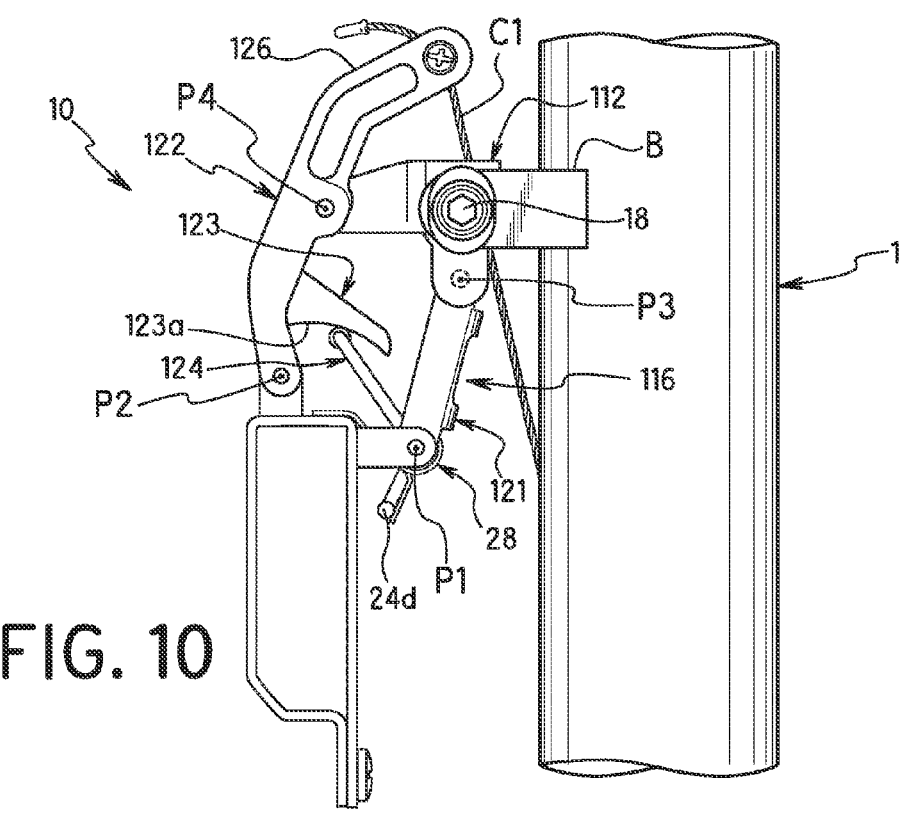
FIG. 10 is a front elevational view of the front derailleur illustrated in FIG. 9 but with the movable member in an extended position with respect to the base member.

The base member 112 is configured to be mounted to the bicycle frame 1 by a fixing bolt 118. The movable member 114 is configured to be movable with respect to the base member 112 between a retracted position (FIGS. 9 and 11) and an extended position (FIGS. 10 and 12).

Figure 11:
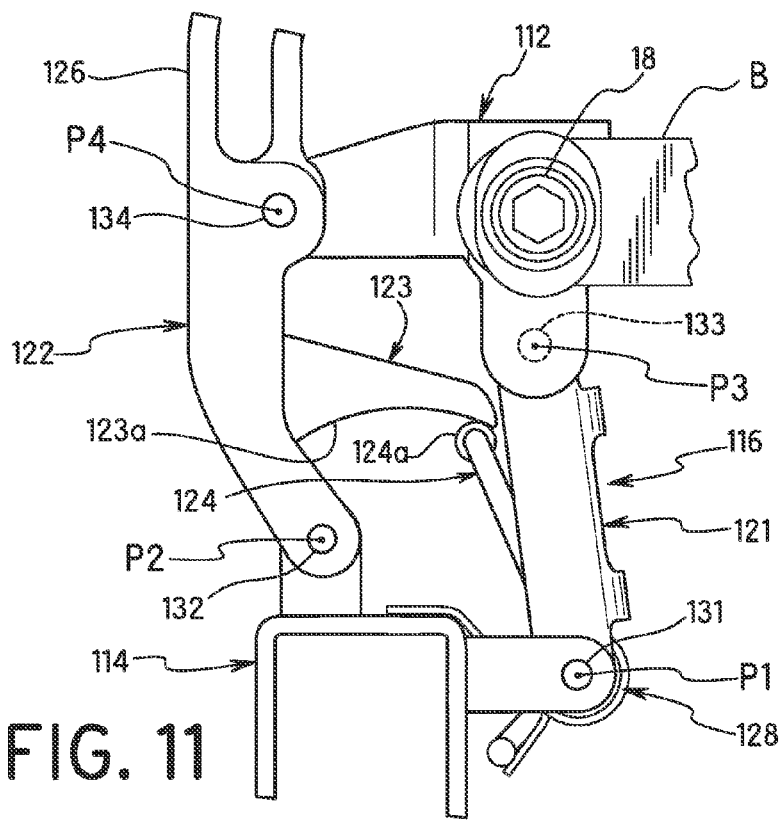
FIG. 11 is an enlarged front elevational view of a portion of the front derailleur illustrated in FIG. 9, with the movable in the retracted position.
Figure 12:
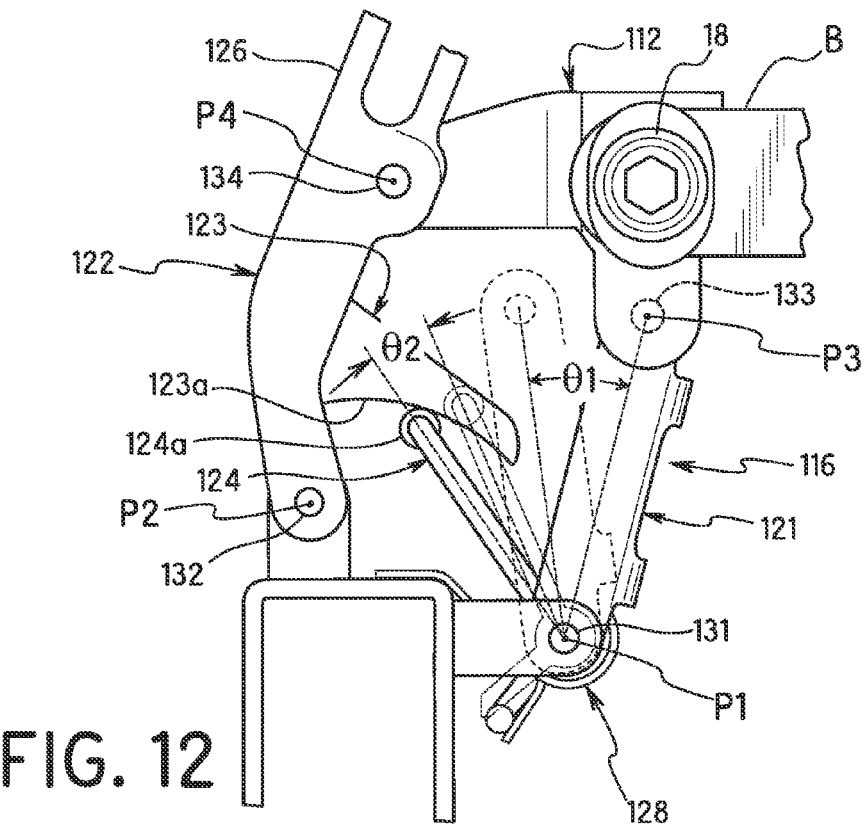
FIG. 12 is an enlarged front elevational view of the front derailleur illustrated in FIG. 10, with the movable in the extended position.
Figure 13:
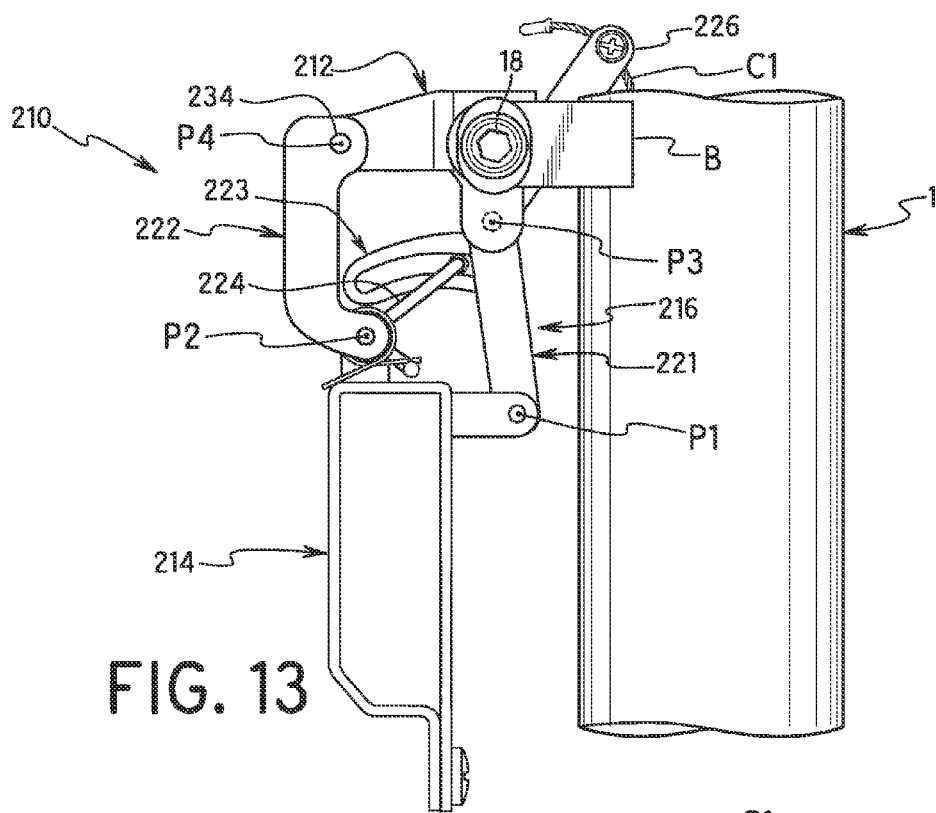
FIG. 13 is a front elevational view of a front derailleur in accordance with a third embodiment with the movable member in a retracted position with respect to the base member.

As seen in FIGS. 11 and 12, the linkage assembly 116 basically comprises a first link 121, a second link 122, an extension link 123 and a sliding link 124. Here, in the second embodiment, the first link 121, the second link 122 and the sliding link 124 are identical to the first link 21, the second link 22 and the sliding link 24, respectively. The extension link 123 basically only differs from the extension link 23 in that the extension link 123 has a curved guide 123a. The curved guide 123a is coupled with a sliding portion 124a of the sliding link 124 such that the sliding portion 124a slides along a curved sliding path as the movable member 14 moves between the retracted position and the extended position. The curved guide 123a has a curved surface as viewed in a direction parallel to the second pivot axis P2. The curved surface is made so that the bottom surface of the extension link 123 is indented.

The bicycle front derailleur 110 further comprises an input arm 126 that is configured to receive an input force to move the linkage assembly 116, which in turn moves the movable member 114 relative to the base member 112. Also the bicycle derailleur 110 further comprises a biasing member 128 that is arranged to bias the movable member 114 towards the retracted position. The input arm 126 and the biasing member 128 are identical to the input arm 26 and the biasing member 28, respectively. Thus, the input arm 126 and the biasing member 128 will not be discussed in further detail.

Similar to the first embodiment, the first and second links 121 and 122 are pivotally attached between the base member 112 and the movable member 114 to form a four-bar linkage having pivot axes P1, P2, P3 and P4. In particular, the first link 121 is pivotally coupled to the movable member 114 about the first pivot axis P1 by a first pivot axle 131. The second link 122 is pivotally coupled to the movable member 114 about the second pivot axis P2 by a second pivot axle 132. The first link 121 is pivotally coupled to the base member 112 about the third pivot axis P3 by a third axle 133. The second link 122 is pivotally coupled to the base member 112 about a fourth pivot axis P4 by a fourth axle 134.

As seen in FIG. 12, with the configuration of the second embodiment, a rotational degree θ1 of the first link 121 is greater than a rotational degree θ2 of the sliding link 124 as the movable member 114 moves between the retracted position and the extended position. Thus, similar to the first embodiment, the front derailleur 110 has a lower overall actuation force as compared to the above-mentioned conventional front derailleurs.

Figure 14:
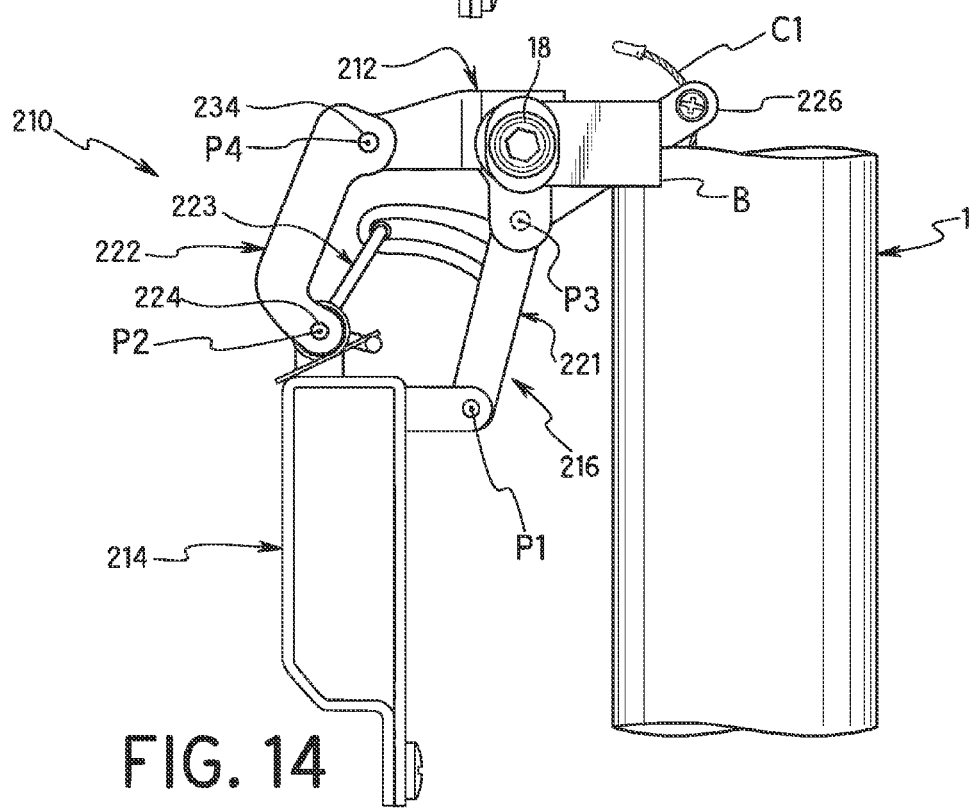
FIG. 14 is a front elevational view of a front derailleur illustrated in FIG. 11 but with the movable member in an extended position with respect to the base member.
Figure 15:
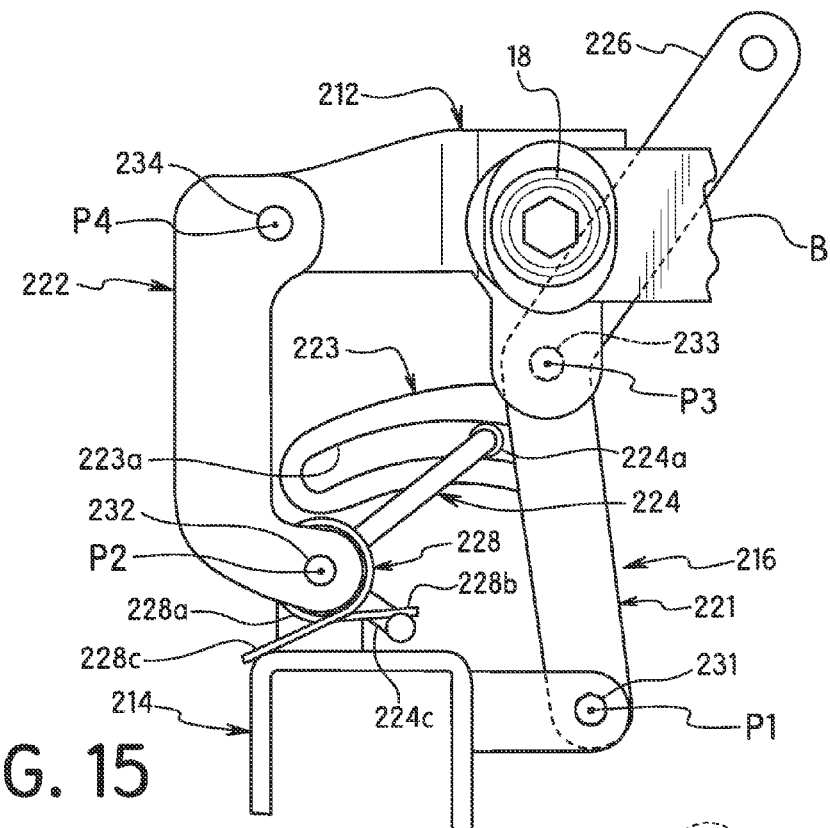
FIG. 15 is an enlarged front elevational view of a portion of the front derailleur illustrated in FIG. 13, with the movable in the retracted position.
Figure 16:
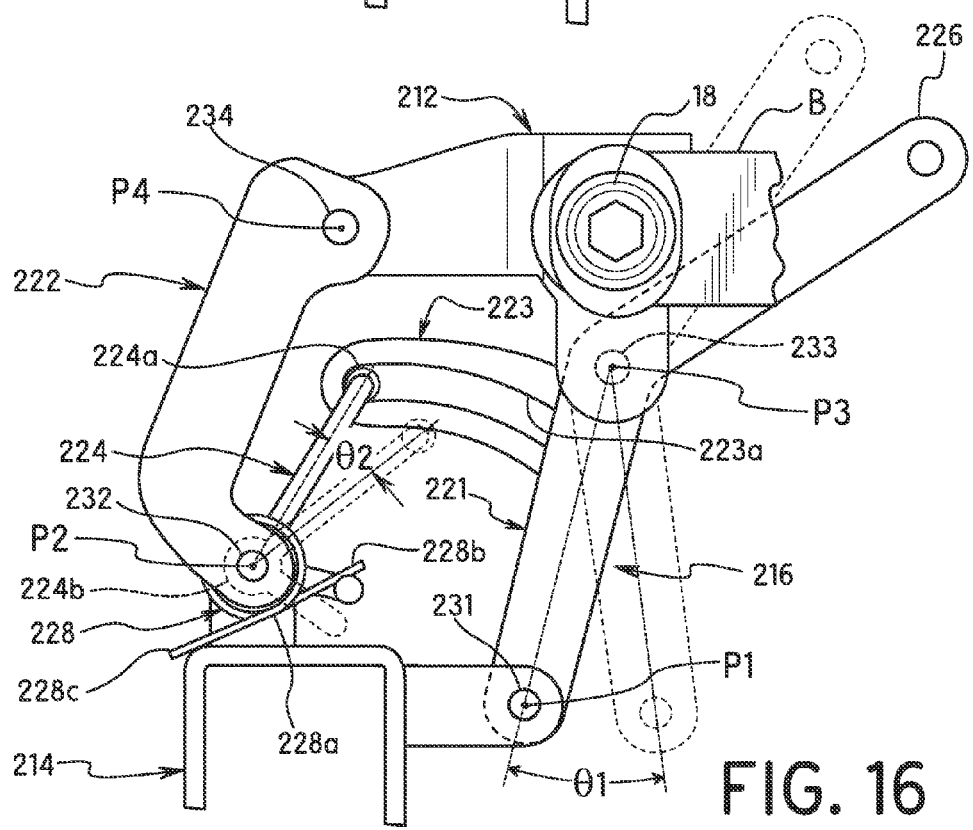
FIG. 16 is an enlarged front elevational view of the front derailleur illustrated in FIG. 14, with the movable in the extended position.

Referring now to FIGS. 13 to 16, a bicycle front derailleur 210 is illustrated in accordance with a third embodiment. The front derailleur 210 is attached to the bicycle frame 1 and operated by movement of the inner wire C1 in the same manner as discussed above with respect to the front derailleur 10. The bicycle front derailleur 210 basically comprises a base member 212, a movable member 214 and a linkage assembly 216. The base member 212 is configured to be mounted to the bicycle frame 1 by a fixing bolt 218. The movable member 214 is configured to be movable with respect to the base member 212 between a retracted position (FIGS. 13 and 15) and an extended position (FIGS. 14 and 16).

The front derailleur 210 is identically to the front derailleur 10, except that the linkage assembly 216 has been modified as explained below. Thus, the parts of the front derailleur 210 that are identical to the front derailleur 10 will not be discussed in detail herein. Rather, it will apparent that the descriptions of the parts of the front derailleur 210 that are identical to the front derailleur 10 also apply to the front derailleur 210. Thus, the following description focuses on the differences of the front derailleur 210 from the front derailleur 10.

As seen in FIGS. 15 and 16, the linkage assembly 216 basically comprises a first link 221, a second link 222, an extension link 223 and a sliding link 224. The bicycle front derailleur 210 further comprises an input arm 226 and a biasing member 228. The first and second links 221 and 222 are pivotally attached between the base member 212 and the movable member 214 to form a four-bar linkage having pivot axes P1, P2, P3 and P4. Preferably, the first, second, third and fourth pivot axes P1 to P4 are arranged to define a parallelogram. Here, in the third embodiment, the extension link 223 is non-movably supported to the first link 221, and extends from the first link 221 towards the second link 222. Since the extension link 223 is non-movably supported to the first link 221, the sliding link 224 is pivotally coupled to the second link 222. The sliding link 224 is pivotally connected to the second link 222 about the second pivot axis P2. The sliding link 224 includes a sliding portion 224a and a pivoting portion 224b. The sliding portion 224a is slidably coupled to the extension link. 223 to slide along the extension link 223. The pivoting portion 224b is pivotally coupled to the second link 222, which does not have the extension link 223.

In the third embodiment, the extension link 223 has a curved guide 223a that is coupled with the sliding portion 224a of the sliding link 224 such that the sliding portion 224a slides along a curved sliding path as the movable member 214 moves between the retracted position and the extended position. It will be apparent to those skilled in the bicycle field from this disclosure that the curved guide 223a could be a straight guide similar to the first embodiment.

The first link 221 is pivotally coupled to the movable member 214 about the first pivot axis P1 by a first pivot axle 231. The second link 222 is pivotally coupled to the movable member 214 about the second pivot axis P2 by a second pivot axle 232. The first link 221 is pivotally coupled to the base member 212 about the third pivot axis P3 by a third axle 233. The second link 222 is pivotally coupled to the base member 212 about a fourth pivot axis P4 by a fourth axle 234.

The input arm 226 is configured to receive an input force to move the linkage assembly 216, which in turn moves the movable member 214 relative to the base member 212. In the third embodiment, the input arm 226 extends from the first link 221. In particular, the input arm 226 is integrally formed with the first link 221. Thus, the first link 221 which includes the input arm 26 has a cable attachment structure 26a.

In the third embodiment, the biasing member 228 that is arranged to bias the movable member 214 towards the retracted position. The biasing member 228 is a torsion spring having a coiled portion 228a that is disposed around the second pivot axis P2. Thus, the coiled portion 228a is mounted on the second pivot axle 232. A first end 228b of the biasing member 228 is engaged with a projection of the sliding link 224. A second end 228c of the biasing member 28 is engaged with the movable member 214. The biasing member 228 is preferably in a pre-load state with the movable member 214 located in the retracted position. As mentioned above, the biasing member 228 operatively is disposed between the base member 212 and the movable member 214 such that the biasing member 228 biases the movable member 214 towards the retracted position. More specifically, the biasing member 228 operatively biases the sliding link 224 to slide toward the first link 221 by a biasing force of the biasing member 228.

As seen in FIGS. 15 and 16, with the configuration of the third embodiment, as the movable member 214 moves from the retracted position (FIG. 15) to the extended position (FIG. 16), the first and second links 221 and 222 both pivot relative to the base member 212 by a rotational degree θ1. Since the first and second links 221 and 222 forms a four-bar linkage with the base member 212 and the movable member 214, the first link 221 pivots about the first pivot axis P1 by the rotational degree θ1 as the movable member 214 moves from the retracted position to the extended position. Likewise, the second link 222 pivots about the second pivot axis P2 by the rotational degree θ1 as the movable member 214 moves from the retracted position to the extended position. On the other hand, as the movable member 214 moves from the retracted position to the extended position, the sliding link 224 pivots about the second pivot axis P2 by a rotational degree θ2. As clearly seen in FIG. 16, the rotational degree θ1 of the first and second links 221 and 222 is greater than the rotational degree θ2 of the sliding link 224 as the movable member 114 moves between the retracted position and the extended position. Thus, similar to the first embodiment, the front derailleur 210 has a lower overall actuation force as compared to the above-mentioned conventional front derailleurs.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle derailleur. Accordingly, these directional terms, as utilized to describe the bicycle derailleur should be interpreted relative to a bicycle in an upright riding position on a horizontal surface and that is equipped with the bicycle derailleur. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle derailleur comprising:
    a base member configured to be mounted to a bicycle frame;
    a movable member configured to be movable with respect to the base member between a retracted position and an extended position at which the movable member is farther from the base member than the retracted position; and
    a linkage assembly operatively coupled between the base member and the movable member, the linkage assembly comprising:
        a first link pivotally coupled to the movable member about a first pivot axis,
        a second link pivotally coupled to the movable member about a second pivot axis spaced apart from the first pivot axis,
        an extension link extending from one of the first and second links toward the other of the first and second links, and
        a sliding link including a sliding portion slidably coupled to the extension link to slide along the extension link and a pivoting portion pivotally coupled to the other of the first and second links.

2. The bicycle derailleur according to claim 1, wherein the sliding link is configured to slide along the extension link toward one of the first and second links in response to pivotal movement of the first and second links about the first and second pivot axes, respectively.

3. The bicycle derailleur according to claim 2, further comprising
    a biasing member operatively biasing the sliding link to slide toward the other of the first and second links by a biasing force of the biasing member.

4. The bicycle derailleur according to claim 1, wherein the first link, the second link, the extension link and the sliding link are configured such that a rotational degree of the first link is greater than a rotational degree of the sliding link as the movable member moves between the retracted position and the extended position.

5. The bicycle derailleur according to claim 1, wherein the extension link is non-movably supported to the one of the first and second links.

6. The bicycle derailleur according to claim 1, further comprising an input arm configured to receive an input force to move the first and second links.

7. The bicycle derailleur according to claim 6, wherein the input arm extends from the one of the first and second links.

8. The bicycle derailleur according to claim 1, wherein the sliding link is shorter than the first link.

9. The bicycle derailleur according to claim 8, wherein the sliding link is shorter than the second link.

10. The bicycle derailleur according to claim 1, wherein the first link is pivotally coupled to the base member about a third pivot axis, and the second link is pivotally coupled to the base member about a fourth pivot axis that is spaced apart from the third pivot axis.

11. The bicycle derailleur according to claim 1, wherein the extension link has a curved guide coupled with the sliding portion of the sliding link such that the sliding portion slides along a curved sliding path as the movable member moves between the retracted position and the extended position.

12. The bicycle derailleur according to claim 1, wherein the sliding link is pivotally connected to the first link about the first pivot axis, the first link being disposed closer to the bicycle frame than the second link in a state where the base member is mounted to the bicycle frame, and
 the extension link extends from the second link towards the first link.

13. The bicycle derailleur according to claim 12, wherein the biasing member is a torsion spring having a coiled portion disposed around the first pivot axis.

14. The bicycle derailleur according to claim 13, further comprising
 an input arm having a cable attachment structure, and the input arm extending from the second link.

15. The bicycle derailleur according to claim 1, wherein the sliding link is pivotally connected to the second link about the second pivot axis, the first link being disposed closer to the bicycle frame than the second link in a state where the base member is mounted to the bicycle frame, and
 the extension link extends from the first link towards the second link.

16. The bicycle derailleur according to claim 15, wherein the biasing member is a torsion spring having a coiled portion disposed around the second pivot axis.

17. The bicycle derailleur according to claim 16, further comprising
 an input arm having a cable attachment structure, and the input arm extending from the first link.

* * * * *